United States Patent
Tung

(10) Patent No.: US 8,204,613 B2
(45) Date of Patent: Jun. 19, 2012

(54) METHOD AND APPARATUS WITH MULTIMEDIA INTERFACE FOR GENERATING AUDIO CLOCK

(75) Inventor: Hsu-Jung Tung, Kao-Hsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1370 days.

(21) Appl. No.: 11/779,874

(22) Filed: Jul. 18, 2007

(65) Prior Publication Data

US 2008/0024661 A1    Jan. 31, 2008

(30) Foreign Application Priority Data

Jul. 26, 2006    (TW) ................................. 95127300 A

(51) Int. Cl.
*G06F 17/00* (2006.01)
*H03L 7/00* (2006.01)
*H04N 9/475* (2006.01)
(52) U.S. Cl. ............................ 700/94; 348/537; 348/515
(58) Field of Classification Search ................ 700/94; 348/537, 138, 515, 552; 381/124
See application file for complete search history.

(56) References Cited

U.S. PATENT DOCUMENTS

| | | | |
|---|---|---|---|
| 6,744,815 B1 | 6/2004 | Sackstein | |
| 6,914,637 B1* | 7/2005 | Wolf et al. | 348/473 |
| 7,088,398 B1* | 8/2006 | Wolf et al. | 348/423.1 |
| 7,283,566 B2* | 10/2007 | Siemens et al. | 370/486 |
| 8,063,986 B2* | 11/2011 | Wang | 348/515 |
| 2004/0252235 A1* | 12/2004 | Ejima | 348/515 |
| 2006/0041773 A1* | 2/2006 | Otomo | 713/503 |
| 2007/0058078 A1* | 3/2007 | Champion | 348/513 |
| 2007/0091935 A1* | 4/2007 | Yonezawa et al. | 370/503 |
| 2008/0298532 A1* | 12/2008 | Wang | 375/376 |

FOREIGN PATENT DOCUMENTS

WO    03058376 A2    7/2003

\* cited by examiner

*Primary Examiner* — Hai Phan
(74) *Attorney, Agent, or Firm* — Winston Hsu; Scott Margo

(57) ABSTRACT

A method for generating an audio clock includes: receiving a reference clock; receiving a received signal from a multimedia interface of a receiver, wherein the received signal comprises a video signal and an audio signal; utilizing one of the reference clock and a video clock of the video signal to count the other of the reference clock and the video clock and determining a ratio signal; and generating an output clock according to the ratio signal and the reference clock.

8 Claims, 4 Drawing Sheets

METHOD AND APPARATUS WITH MULTIMEDIA INTERFACE FOR GENERATING AUDIO CLOCK

BACKGROUND OF THE INVENTION

1. Field of the Invention

The present invention relates to a multimedia device, and more particularly, to an apparatus of a multimedia device with a multimedia interface for generating an audio clock.

2. Description of the Prior Art

In high definition multimedia interface (HDMI), video data and audio data are transmitted simultaneously using transition minimized differential signaling (TMDS). According to the HDMI specification, only a video frequency is directly transmitted via the cable. However, an audio clock is indirectly obtained through a first parameter N, and a second parameter CTS, both of which are recorded in an audio information frame, and the video frequency. According to the method described in the HDMI specification, the first parameter N, the second parameter CTS, the video frequency $F_V$ and an audio sampling frequency $F_A$ satisfy the following equation:

$$\frac{1}{(128 \times F_A)} \times N = CTS \times \frac{1}{F_V}$$

The quality of the generated audio clock is not good because the video clock itself may have jitter, or the video clock may be interfered by other noise signals during a data transmission process. In addition, both the first parameter N and the second parameter CTS are very large, so the PLL of the receiver for the audio clock needs components with high sensitivity implemented in the circuit design. Due to the above reasons, the conventional method for generating the audio clock has practical difficulties and restrictions.

SUMMARY OF THE INVENTION

It is one of the objectives of the present invention ratio signal to solve at least one of the above-mentioned problems.

According to one aspect of the present invention, a method for generating an audio clock comprises: receiving a reference clock; receiving a received signal from a multimedia interface of a receiver, wherein the received signal comprises a video signal and an audio signal; utilizing one of the reference clock and a video clock of the video signal to count the other of the reference clock and the video clock and determining a ratio signal; and generating an output clock according to the ratio signal and the reference clock.

According to one aspect of the present invention, an apparatus for generating an audio clock comprises: an interface to receive a received signal over a transmission medium, wherein the received signal comprises a video signal and an audio signal; a first clock generator to generate a reference clock; a computing unit, coupled to the interface, to receive a video clock of the video signal and the reference clock, to generate a ratio signal according to the video signal and the reference clock, and to output an output clock according to the ratio signal and the reference clock; and a determining unit, coupled to the computing unit, to determine a frequency of the audio clock from a plurality of audio sampling frequencies according to the output clock.

These and other objectives of the present invention will no doubt become obvious to those of ordinary skill in the art after reading the following detailed description of the preferred embodiment that is illustrated in the various figures and drawings.

DETAILED DESCRIPTION

The present invention utilizes either a reference clock $C_X$ generated from a HDMI receiver or a video clock $C_V$ received through a HDMI cable to count the other clock for determining a ratio value which is an integer or a non-integer, and then generates an audio clock $C_A$ according to the ratio value and the reference clock $C_X$, so the method for generating the audio clock $C_A$ of the present invention has at least two different embodiments: the first one uses the reference clock $C_X$ to count the video clock $C_V$, and the second one uses the video clock $C_V$ to count the reference clock $C_X$. In contrast to the prior art, the method of the present invention obtains the audio clock $C_A$ by multiplying the frequency of the reference clock $C_X$ through a phase-locked loop according to the ratio value, so it is not required to consider problems of the jitter in the video clock $C_V$ and noise interference during a data transmission process.

Figure 1:
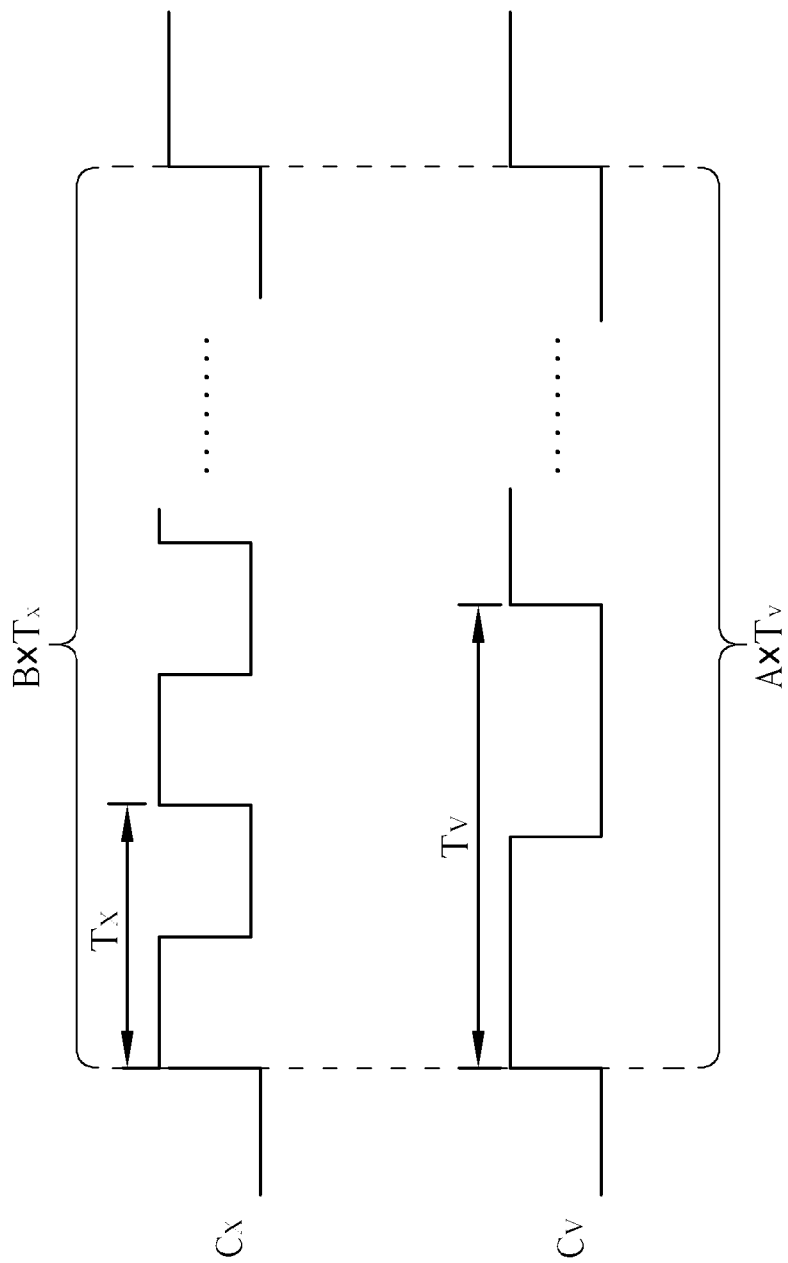
FIG. 1 is a waveform diagram of a reference clock and a video clock in a first embodiment of the present invention.

Please refer to FIG. 1. FIG. 1 is a waveform diagram of a reference clock $C_X$ and a video clock $C_V$ in a first embodiment of the present invention. As shown in FIG. 1, the period of the reference clock $T_X$ is shorter than the period of the video clock $T_V$, hence the video clock $C_V$ is counted by the reference clock $C_X$ (for example, generated by a crystal oscillator or a free-run clock generator) in this embodiment. The periods $T_X$ and $T_V$ satisfy the following equation: $A \times T_V = B \times T_X$, that is to say, the length of A periods of the video clock $C_V$ is equal to the length of B periods of the reference clock $C_X$, in which, A is defined as a predetermined period number of the video clock $C_V$ to be counted by the reference clock $C_X$, and B/A is defined as a ratio value. Wherein $A \geq 1$. Therefore, the period of the reference clock $T_X$ and the period of the video clock $T_V$ satisfy the following equation:

$$T_V = \frac{B}{A} \times T_X \qquad \text{Eq. 1}$$

According to the HDMI specification, a first integer, i.e., a first parameter N, a second integer, i.e., a second parameter CTS, the period of the video clock $T_V$ and the period of the audio clock $T_A$ satisfy the following conventional equation:

$$\frac{T_A}{128} \times N = CTS \times T_V \qquad \text{Eq. 2}$$

in which, the first parameter N and the second parameter CTS are included in an audio information frame, and are transmitted with the video clock $C_V$ through a HDMI cable to the HDMI receiver. Finally, the HDMI receiver obtains the audio clock $C_A$ according to these two parameters.

Substituting Eq.1 into Eq.2 results in a third equation defining a relationship between the period of the audio clock $T_A$ and the period of the reference clock $T_X$ as below:

$$T_A = 128 \times \left(\frac{CTS}{N}\right) \times \left(\frac{B}{A}\right) \times T_X \qquad \text{Eq. 3}$$

It can be seen from Eq.3 that, because the first parameter N and the second parameter CTS can be extracted from the received signal, the period of the audio clock $T_A$ can be computed as long as the ratio value B/A for the period of the video clock $T_V$ and the period of the reference clock $T_X$ can be obtained. That is, the audio clock $C_A$ is generated by multiplying the frequency of the reference clock $C_X$ with a multiplier 128×(CTS/N)×(B/A) through a phase-locked loop (PLL). The phase-locked loop takes a stable reference clock $C_X$ as an input clock so the generated audio clock $C_A$ is more stable than an audio clock directly obtained from the video clock $C_V$ through the phase-locked loop.

In a preferred embodiment, the frequency of the audio clock $C_A$ can only be one of several discrete audio sampling frequencies, for example, the sampling frequencies of the audio clock $C_A$ may be 32 KHz, 44.1 KHz, 48 KHz, 88.2 KHz, 176.4 KHz, 96 KHz or 126 KHz. If the reciprocal of the period of the audio clock $T_A$ computed according to Eq.3 is not any of the above frequency values due to computation errors, a frequency value in the above frequencies that is closest to the reciprocal of the period of the audio clock $T_A$ computed according to Eq.3 is taken to serve as the frequency of the audio clock $C_A$.

In addition, the two frequency values that are closest to each other out of the above-mentioned frequency values are 44.1 KHz and 48 KHz, and the difference of the two frequency values is (48−44.1)/48≅0.08. Therefore, the maximum error value E cannot exceed half the difference of the two frequency values, i.e. 4%; otherwise, the correct frequency of the audio clock cannot be selected from the above-mentioned frequency values according to the computed period of the audio clock $T_A$. To avoid this situation, the predetermined period number A of the video clock $C_V$ counted by the reference clock $C_X$ has better being sufficiently large (because the larger the number of the period, the smaller the error value), or the period of the reference clock $T_X$ for the counting operation has better being sufficiently short so that the maximum error value does not exceed 4%. The method for determining the minimum value of the predetermined period number A is described in the following.

The reference clock $C_X$ can be selected according to a designer's wishes, and the period of the reference clock $T_X$ is decided after the reference clock $C_X$ has been selected. However, there usually exists an error in digital measurement. Taking account of the actual measurement accuracy of the reference clock $C_X$, K is a tolerable period number error when the period number of the video clock $T_V$ counted by the reference clock $C_X$ is equal to A. As $A \times T_V = B \times T_X$, the error value is as below:

$$KT_X/BT_X = KT_X/AT_V \qquad \text{Eq. 4}$$

In HDMI specification, the frequency distribution of the video clock $C_V$ is from 25 MHz to 165 MHz, and it is can be seen from Eq.4 that a maximum error value E will occur when the period of the video clock $T_V$ is shortest. That is, the minimum period of the video clock $T_{V,min}$ is 6 ns when the frequency of the video clock $C_V$ is the maximum, 165 MHz. Therefore, the maximum error value E must meet the following inequality:

$$[K \times T_X/(A \times T_{V,min})] \leq E \qquad \text{Eq. 5}$$

Then the minimum value of the predetermined period number A can be determined according to Eq.5.

For example, suppose that the maximum error value E is equal to 4%, the minimum period of the video clock $T_{V,min}$ is 6 ns, the period of the reference clock $T_X$ is 50 ns, and the period number error K is equal to 2. Substituting these values into Eq.5 results in [2×50/(A×6)]≦0.04. Therefore, the predetermined period number A must be larger than 416.6, such as an integer equaling 417 (the integer closest to 416.6) or an integer equaling 512 or 1024 far greater than 416.6.

Figure 2:
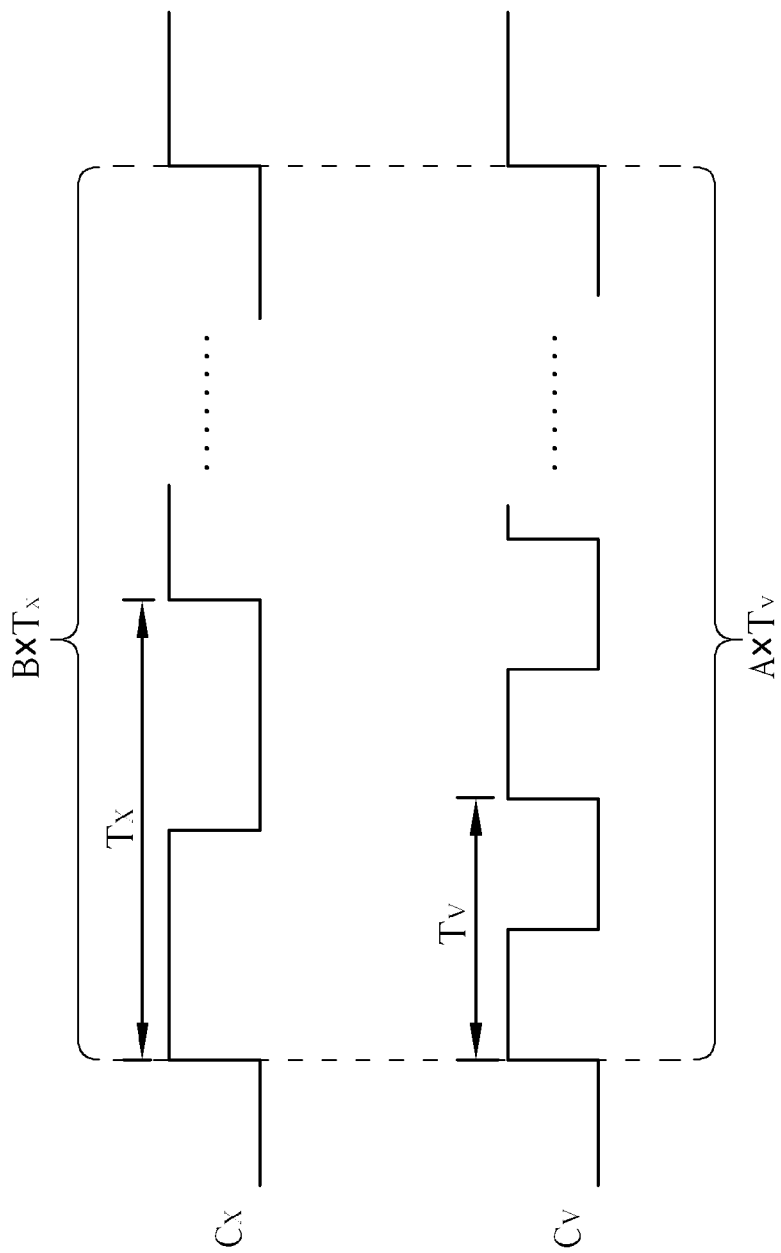
FIG. 2 is a waveform diagram of a reference clock and a video clock in a second embodiment of the present invention.

On the other hand, when the period of the reference clock $T_X$ is longer than the period of the video clock $T_V$, then the reference clock $C_X$ is counted by the video clock $C_V$. Please refer to FIG. 2. FIG. 2 is a waveform diagram of a reference clock $C_X$ and a video clock $C_V$ in a second embodiment of the present invention. In the same way, the periods $T_X$ and $T_V$ satisfy the following equation: $A \times T_V = B \times T_X$, in which, B is defined as a predetermined period number of the reference clock $C_X$ counted by the video clock $C_V$, and B/A is defined as a ratio value. The relation between the period of the audio clock $T_A$ and the period of the reference clock $T_X$ is also determined by Eq.3, but the maximum error value E is determined by the predetermined period number B instead of predetermined period number A in the first embodiment. K is a tolerable period number error when the period number of the reference clock $T_X$ counted by the video clock $C_V$ is equal to B. The error value is as below:

$$KT_V/AT_V = KT_V/BT_X \qquad \text{Eq. 6}$$

It can be seen from Eq.6 that a maximum error value E will occur when the period of the video clock $T_V$ is longest. That is to say, the maximum period of the video clock $T_V$, max is 40 ns when the frequency of the video clock $C_V$ is the minimum, 25 MHz. Therefore, the maximum error value E must meet the following inequality:

$$[K \times T_{V,max}/(B \times T_X)] \leq E \qquad \text{Eq. 7}$$

Then the minimum value of the predetermined number of the period B can be determined according to Eq.7, and the period of the audio clock $T_A$ can be obtained from Eq. 3.

For example, suppose that the maximum error value E is 4%, the maximum period of the video clock $T_{V,max}$ is 40 ns, the period of the reference clock $T_X$ is 50 ns, and the period number error K is equal to 2. Substituting these values into Eq.7 results in [2×40/(B×50)]≦0.04. Therefore, the predetermined period number B is larger than or equal to 40, such as an integer equaling 40 or another integer far greater than 40. Suppose that the predetermined period number B is 130, the frequency of the video clock $C_V$ is 74.25 MHz, the first parameter N is 11648, and the second parameter CTS is 210937. Substituting these values into Eq.1 results in $$A = \frac{B \times T_X}{T_V}$$

$$= \frac{130 \times 50 \text{ ns}}{1/74.25 \text{ M}}$$

$$= 482.625.$$

If the actual value of A is 484, by referring to Eq.3, the period of the audio clock can be obtained as below:

$$T_A = 128 \times \left(\frac{CTS}{N}\right) \times \left(\frac{B}{A}\right) \times T_X$$

$$= 128 \times \left(\frac{210937}{11648}\right) \times \left(\frac{130}{484}\right) \times 50 \text{ ns}$$

$$\cong 31.13 \text{ μs}$$

The computed frequency of the audio clock, therefore, is 32.12 KHz. Compared with aforementioned frequency values, it can be determined that the frequency of the audio clock is 32 KHz.

Figure 3:
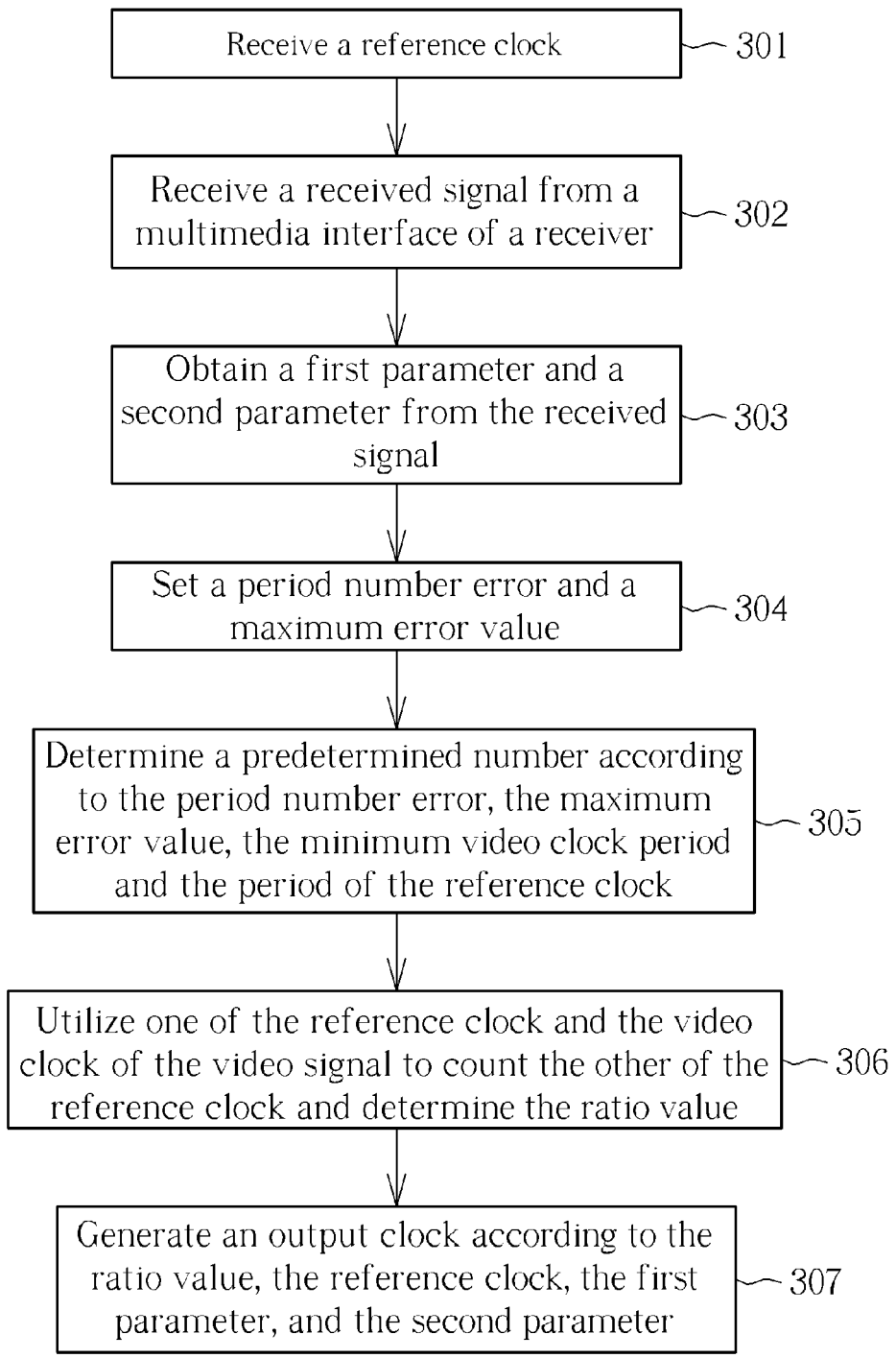
FIG. 3 is a flowchart illustrating a method for generating an audio clock according to an embodiment of the present invention.

As mentioned above, the method for generating the audio clock $C_A$ of the present invention can be summarized as the steps in FIG. 3. FIG. 3 is a flowchart illustrating a method 300 for generating the audio clock $C_A$ according to an embodiment of the present invention. Provided that substantially the same result is achieved, the steps of the flowchart shown in FIG. 3 need not be in the exact order shown and need not be contiguous, that is, other steps can be intermediate. The method 300 comprises:

Step 301: Receive the reference clock $C_X$;

Step 302: Receive the received signal from a multimedia interface of a receiver, wherein the received signal comprises the video signal $C_V$ and the audio signal $C_A$;

Step 303: Obtain the first parameter N and the second parameter CTS from the received signal;

Step 304: Set the period number error K and the maximum error value E;

Step 305: Determine the predetermined number A according to the period number error K, the maximum error value E, the minimum video clock period $T_{V,min}$ and the period of the reference clock $T_X$;

Step 306: Utilize one of the reference clock $C_X$ and the video clock of the video signal $C_V$ to count the other of the reference clock $C_X$ and determine the ratio value; and Step 307: Generate the output clock according to the ratio value, the reference clock $C_X$, the first parameter N, and the second parameter CTS.

Figure 4:
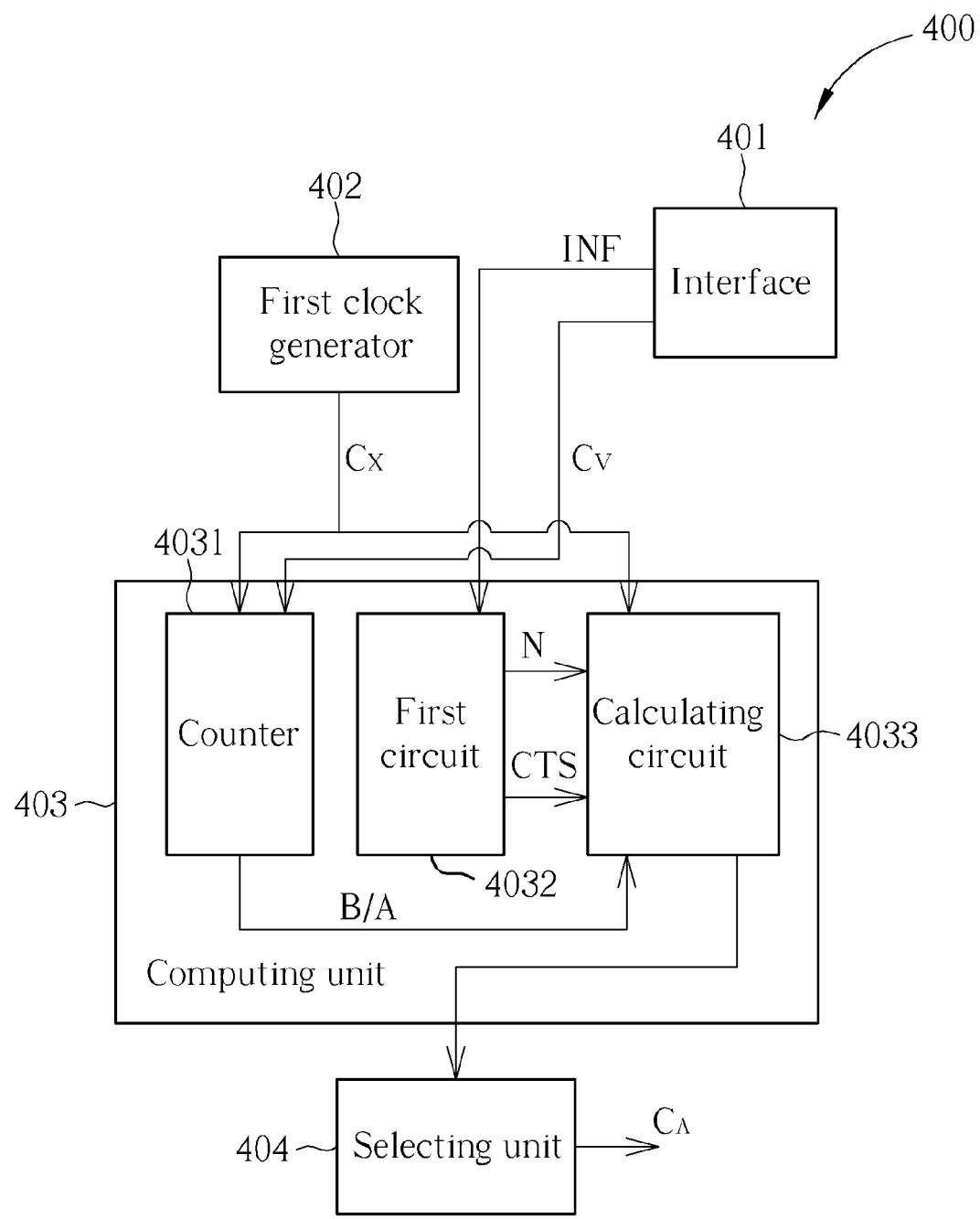
FIG. 4 is a diagram illustrating an apparatus for generating an audio clock according to an embodiment of the present invention.

Certainly, the methods mentioned above also can be implemented by hardware. For examples, FIG. 4 is a diagram illustrating an apparatus 400 for generating the audio clock according to an embodiment of the present invention. The apparatus 400 comprises an interface 401, a first clock generator 402, a computing unit 403, and a selecting unit 404, wherein the computing unit 403 comprises a counter 4031, a first circuit 4032, and a calculating circuit 4033. In the apparatus 400 performing the same function, the interface 401 is used for receiving the received signal, including video data and audio data, over a HDMI cable, the first clock generator 402 is used for generating the reference clock $C_X$, the computing unit 403 is used for receiving the video clock $C_V$ of the received signal and the reference clock $C_X$ to generate an estimated audio clock according to the reference clock and the received signal which includes the video clock $C_V$, the first parameter N, and the second parameter CTS. The selecting unit 404 is utilized for receiving the estimated audio clock to select one of the plurality of audio sampling frequencies mentioned above to be the frequency of the audio clock $C_A$ according to the estimated audio clock, wherein the selected sampling frequency is the closet to the frequency of the estimated audio clock. In an embodiment, the computing unit 403 further includes the counter 4031 for receiving the video clock $C_V$ and the reference clock $C_X$ to generate the ratio value according to the video clock $C_V$ and the reference clock $C_X$, the first circuit 4032 for generating the first parameter N and the second parameter CTS from the information frame INF of the audio signal, and the calculating circuit 4033 for generating the estimated audio clock according to the first parameter N, the second parameter CTS, the ratio value and the reference clock. In an embodiment, the computing unit further includes a frequency divider that has the factor A is used for dividing the frequency of the video clock. In an embodiment, the determining circuit not shown) is used for determining whether the period of the reference clock $C_X$ is shorter than the period of the video clock $C_V$. If the period of the reference clock $C_X$ is shorter than the period of the video clock $C_V$, the computing unit 403 satisfies the Eq.1, the Eq.3 and Eq.5. And if the period of the reference clock $C_X$ is longer than the period of the video clock $C_V$, the computing unit 403 satisfies the Eq.1, the Eq.3 and the Eq.7.

Those skilled in the art will readily observe that numerous modifications and alterations of the device and method may be made while retaining the teachings of the invention.

What is claimed is:

1. A method for generating an audio clock, comprising:
   receiving a reference clock generated by a high-definition multimedia interface (HDMI) receiver;
   receiving a received signal from a multimedia interface of the HDMI receiver, wherein the received signal comprises a video signal and an audio signal;
   obtaining a first parameter N and a second parameter CTS from the received signal;
   determining a ratio value by utilizing one of the reference clock and a video clock of the video signal to count the other of the reference clock and the video clock;
   generating an output clock according to the first parameter N, the second parameter CTS, the ratio value and the reference clock; and
   determining one of a plurality of audio sampling frequencies according to a frequency of the output clock to serve as a frequency of the audio clock, wherein the frequency of the audio clock is one of the plurality of audio sampling frequencies, which is closest to the frequency of the output clock; and
   generating the audio clock having the determined audio sampling frequency.

2. The method of claim 1, wherein the plurality of audio sampling frequencies comprises 32 KHz, 44.1 KHz, 48 KHz, 88.2 KHz, 176.4 KHz, 96 KHz, and 192 KHz.

3. The method of claim 1, further comprising:
   dividing a frequency of the video clock according to a predetermined number A.

4. The method of claim 3, further comprising:
   determining a period number error K and a maximum error value E;
   determining the predetermined number A according to the period number error K, the maximum error value E, a minimum video clock period $T_{V,min}$ and a period of the reference clock $T_X$.

5. The method of claim 4, wherein the predetermined number A satisfies an inequality: $[K \times T_X/(A \times T_{V,min})] \leq E$.

6. The method of claim 4, wherein the predetermined number A is determined such that the maximum error value E is less than 4%.

7. A high-definition multimedia interface (HDMI) receiver for generating an audio clock, comprising:
   an interface to receive a received signal over an HDMI cable, wherein the received signal comprises a video signal and an audio signal;

a first clock generator to generate a reference clock;
a computing unit, coupled to the interface and the first clock generator, to receive a video clock of the video signal and the reference clock, to generate a ratio value; wherein the computing unit comprising:
  a counter to utilize one of the reference clock and the video clock of the video signal to count the other of the reference clock and the video clock and to output the ratio value;
  a first circuit to obtain a first parameter N and a second parameter CTS from the received signal; and
  a second clock generator to generate an output clock according to the first parameter N, the second parameter CTS, the ratio value, and the reference clock;
a selecting unit, coupled to the computing unit, to select a frequency for an audio clock from a plurality of audio sampling frequencies according to the output clock, wherein the frequency of the audio clock is one of the plurality of audio sampling frequencies, which is closest to the frequency of the output clock; and to generate the audio clock having the selected audio sampling frequency.

8. The HDMI receiver of claim 7, wherein the plurality of audio sampling frequencies comprise 32 KHz, 44.1 KHz, 48 KHz, 88.2 KHz, 176.4 KHz, 96 KHz, and 192 KHz.

* * * * *